J. W. WEBB.
Vegetable Cutter.
No. 3,043.
Patented April 10, 1843.
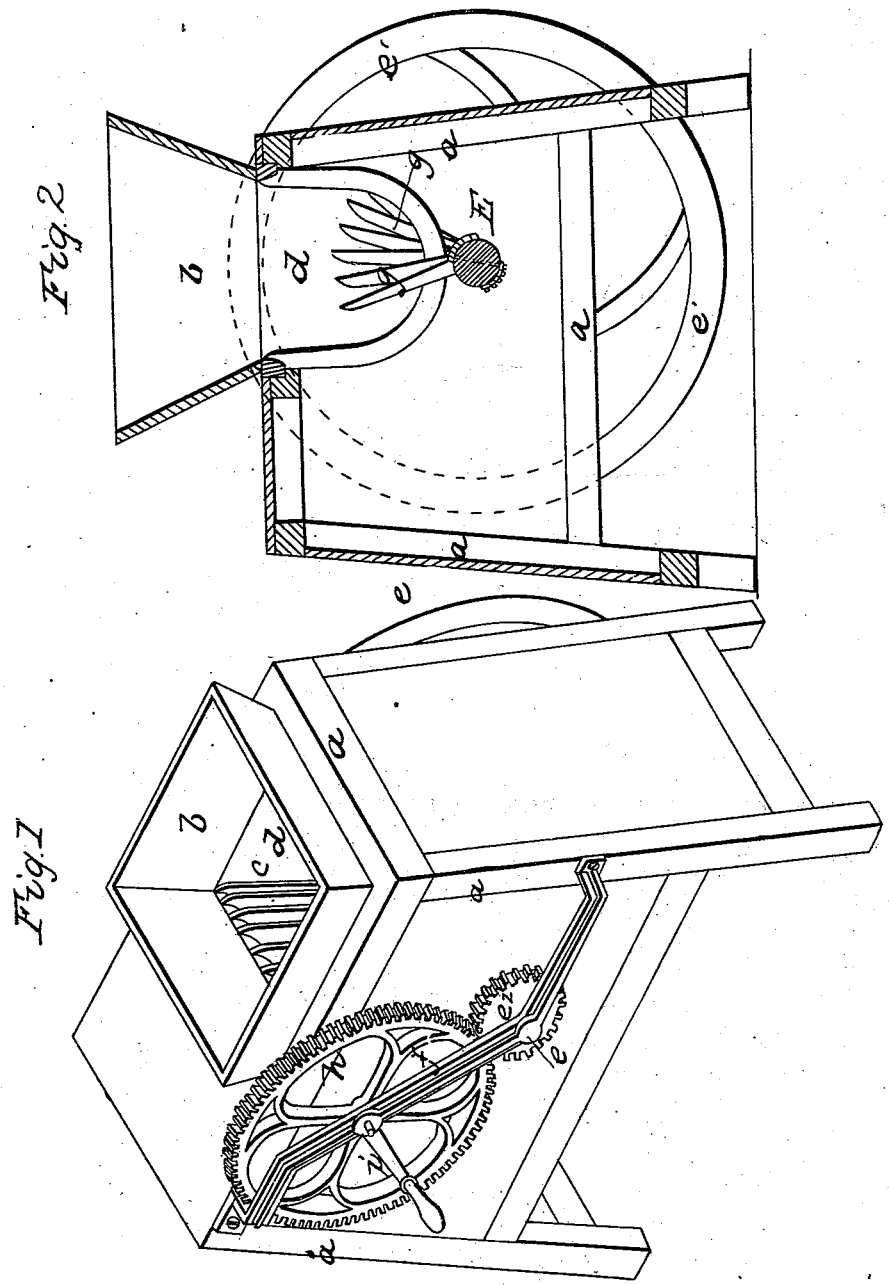

UNITED STATES PATENT OFFICE.

JOS. W. WEBB, OF MOUNT MORRIS, NEW YORK.

VEGETABLE-CUTTER.

Specification of Letters Patent No. 3,043, dated April 10, 1843.

*To all whom it may concern:*

Be it known that I, JOSEPH W. WEBB, of Mount Morris, in the county of Livingston and State of New York, have invented a new and useful Machine for Cutting Vegetables; and I do hereby declare that the following is a full, clear, and exact description thereof, reference being had to the accompanying drawing, making a part of this specification, in which—

Figure 1 is an isometrical view, Fig. 2, a vertical section.

The nature of my invention consists in combining a grating of a basket form with revolving blades on a shaft placed below said grating so as to prevent the machine from being clogged and operate rapidly and effectively.

The frame ($a$) of this machine is formed oblong and the spaces between the posts and string pieces are inclosed; on the top of this frame there is a hopper ($b$) below which a grating ($c$) is situated; this is of a concave form somewhat bell shaped in its section, and is cast in one piece with sides ($d$) which project as low as the grate bars.

Just below the grating, and under its center, a shaft ($e$) is situated; on one end of which, outside of the frame there is a fly wheel ($e'$); on the other end a pinion ($e^2$) is affixed; near one end this shaft has a bearing in the frame; at the other end its bearing is in a diagonal iron brace ($f$) extending from the cap piece of the frame at one end, down to the upright at the other; the shaft ($e$) is also armed with a series of knives ($g$) extending out radially from it its whole length they are set spirally around about one third of its circumference and stand out from it seven or eight inches more or less; they are affixed to the shaft by a bolt, which passes through the shoulder of the knife and shaft and receives a nut on the other side of the shaft. Two of the above named knives revolve in each of the spaces in the grate, in which the material to be operated on is placed.

At the side of the frame above the pinion ($e^2$) a spur wheel ($h$) is placed which works into it; the bearings of the axle of which are in the diagonal brace ($f$) above named, and the side of the frame; on the axle of this wheel the crank ($i$) is put by which the machine is put in motion; the vegetables are put into the hopper and by the revolution of the knives are cut in a very expeditious and perfect manner and keeping the machine always free from being choked.

What I claim as my invention and desire to secure by Letters Patent is—

The combination of the revolving knives (placed two in each span of the grate) with the concave grate arranged and constructed in the manner and for the purpose above specified.

JOSEPH W. WEBB.

Witnesses:
J. J. GREENOUGH,
J. H. GODDARD.